Sept. 2, 1924.  
E. BUCKINGHAM  
1,507,272  
INTERNAL EXPANDING GAUGE  
Filed July 10, 1920
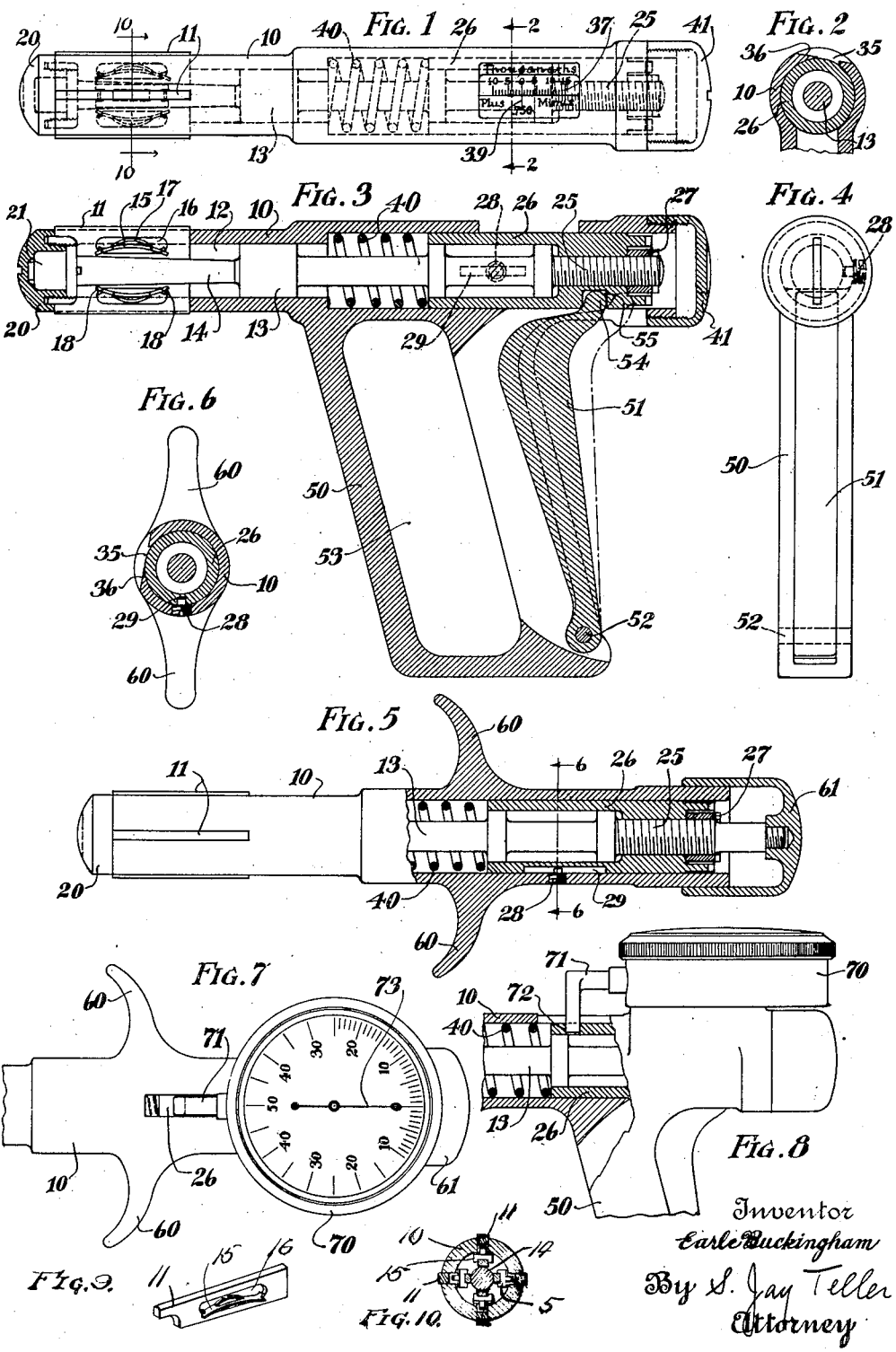
Inventor  
Earle Buckingham  
By S. Jay Teller  
Attorney Patented Sept. 2, 1924.

1,507,272

UNITED STATES PATENT OFFICE.

EARLE BUCKINGHAM, OF HARTFORD, CONNECTICUT, ASSIGNOR TO PRATT & WHITNEY COMPANY, OF NEW YORK, N. Y., A CORPORATION OF NEW JERSEY.

INTERNAL-EXPANDING GAUGE.

Application filed July 10, 1920. Serial No. 395,214.

*To all whom it may concern:*

Be it known that I, EARLE BUCKINGHAM, a citizen of the United States, residing at Hartford, Connecticut, have invented certain new and useful Improvements in Internal-Expanding Gauges, of which the following is a specification.

This invention relates to gauges and in particular to gauges for internal dimensions.

One of the objects of this invention is to provide a compact, easily handled and accurate gauge adapted to indicate a linear dimension within a very slight error.

Another object of the invention is to provide an improved gauge, the gaging members of which are controlled by the sliding movement of a slightly tapered rod, the position of which when the gaging members are in gaging position serve to indicate the size at which said gaging members are set.

Another object of the invention is to provide a gauge of the above type adapted to have either a scale mounted thereon to determine the relative position of the tapered rod and the gaging members, or, if desired, to have a dial indicator mounted on the body member for this purpose.

With the above and other objects in view my invention consists in the features of construction and operation set forth in the following specification and illustrated in the accompanying drawings forming a part hereof.

In the accompanying drawings I have shown several modifications of the invention which I now deem preferable, but it is to be understood that changes and modifications may be made within the scope of the appended claims without departing from the spirit of the invention.

In the drawings:

Figure 1 is a plan view of one form of the invention;

Fig. 2 a transverse section taken on line 2—2 of Fig. 1;

Fig. 3 a longitudinal section in elevation showing one form of the invention;

Fig. 4 an end view of the gauge shown in Figs. 1, 2 and 3;

Fig. 5 a longitudinal view partly in section of a modified form of the invention;

Fig. 6 a view of the form of invention shown in Fig. 5 taken on line 6—6 of Fig. 5;

Fig. 7 a plan view of another modified form of the invention;

Fig. 8 an elevational view of a still further modification of the invention.

Fig. 9 is a perspective view of one of the gaging members, and

Fig. 10 is a cross sectional view taken on line 10—10 of Fig. 1.

As illustrated in the above mentioned drawings, the modifications of the invention selected for illustration in their entirety comprise the following principal parts: first, a body member; second, a slidably mounted rod contained within the body member and having near one end a conical shaped portion; third, gaging members contacting with and movable in accordance with the longitudinal movements of the rod; fourth, indicating means such as the scale or the dial indicator to determine the position of the rod; fifth, suitable gripping portions on the body member in order to facilitate movement of the rod to force the gaging members out of gaging position; and sixth, resilient means forcing the rod in one direction and forcing the gaging members into their gaging position.

Referring more in detail to the figures of the drawing, at 10 is shown the body portion of the gauge in which the operating parts of the device are mounted. At the forward end of this body portion are inserted gaging members 11, preferably four of these gaging members 11 are provided grouped equally about the periphery of this end of the body member and set radially in suitable slots in the body member 10. The interior of the body member 10 is suitably bored as shown at 12 in which slides a rod 13. The portion of the rod 13 directly adjacent the gaging members 11 is tapered as shown at 14 so that as the rod 13 is moved forward and back in the cavity 12, the gaging members 11 are forced in and out. To maintain the gauge members in contact with the conical surface 14, I provide suitable leaf springs 15.

The leaf springs 15 which are preferably arc-shaped as shown are inserted within openings 16 in the central portion of the gauge members 11 and are wider than the gaging members 11 Fig. 10 so that their central portions engage the inner surface of the body member 10 and their ends press against the gaging members 11. This construction will be evident from Figures 3 to 9 and 10. This specific form of the leaf spring illustrated has a raised portion 17 near its center which may enter the slot in which gauge member 11 operates, and has overhanging ends 18 as shown so that the spring member is held rigidly in place and always tends to straighten thus resiliently forcing the gauge members 11 in contact with the taper or cone 14.

The forward end of the body member 10 is closed by a cap 20 threaded, as shown, into the threaded end of the hole 12. This cap 20 has a recess 21 permitting the taper portion 14 of rod 13 to enter when the rod 13 is in its forward position.

From the above description, it will be seen that a movement of the rod 13 will force the gauge members 11 into and out of their gaging positions and that for any definite position of the rod 13, the members 11 will indicate a definite predetermined diameter or other linear dimension.

In order to definitely and precisely determine the position of the rod 13, and consequently the position of the gauge members 11, I provide the following construction: The rod 13 is extended rearwardly and at its rear end is provided with a threaded portion 25. Threaded over this portion 25 is a sleeve 26 which is held securely in any adjusted position on the rod 13 by the threaded portion 25 and the locking nut 27. A small screw 28 Fig. 5 which is threaded into the body member 10 and has a projecting portion engaging a slot 29 in the sleeve 26, prevents rotation of this sleeve 26 and consequently of the rod 13.

The upper surface of the body member 10 is cut away as shown at 35, in Fig. 2, thus providing a surface 36 on which indicia such as zero line 39 may be engraved. On sleeve 26 a short scale 37 is provided adjacent the zero line 39. Sliding movement of the rod 13 will, therefore, cause the scale 37 to move past the zero line 39 thus accurately determining the position of the rod 13. In the modification shown the graduations of scale 37 are in thousandths, that is a movement of the rod 13, a distance equal to the distance between adjacent graduations of the scale represent a movement of one thousandth of an inch of the gaging surfaces of opposite gauge members 11. Mounted forwardly of the sleeve 26 and housed in the body member 10 is a coiled spring 40. This tends to force the sleeve 26 and rod 13 rearwardly thus tending to force the gaging members 11 to their outermost position.

The rear end of the body member 10 is closed by a suitable cap 41, thus completely enclosing the working parts of the gauge.

To compensate for wear and also for making the initial adjustment of the gauge, it is only necessary to remove the cap 41 and adjust the sleeve 26 on the threaded end 25 of the rod 13 and securely fix it in adjusted position by the clamping nut 27.

Any convenient means may be utilized to facilitate the insertion of the gaging members 11 into the hole or other dimension to be gaged. I prefer, however, to provide means for moving the rod 13 and sleeve 26 to their forwardmost position thus retracting the gauge members 11 to their innermost position. When the gauge has been inserted into gaging position, the rod 13 may be allowed to move backward under the influence of the spring 40 until the gauge members 11 come into contact with the part to be gaged. Their position may then be determined by the position of the sleeve 26 relative to the body member 10 as indicated by the position of the zero mark 39 relative to the scale 37.

To move the rod 13 forward relative to the body member 10, I have shown two constructions. That shown in Fig. 3 comprises a handle grip member 50 which may be grasped by the fingers of the operator depending from the body member 10 and preferably formed integrally therewith, and a pivoted lever 51, pivoted as shown at 52 near the lower end of the handle 50. By grasping this handle 50, lever 51 may be tilted about its pivot 52 by a part of the same hand grasping the grip 50 thus forcing the rod 13 forwardly against the pressure of spring 40. As shown, the upper end of the lever 51 is in the form of a ball 54 and engages the transverse slot or depression 55 provided in the lower portion of the sleeve 26. For lightness I prefer to remove a large part of the handle 50 as shown at 53.

Referring to the modification shown in Figs. 5 and 6 a simpler and more compact modification is shown. In this form of the invention the body member 10 is provided on either side with finger grip 60. By grasping this form of the gauge by these lugs or finger grips 60 and pressing the cap 61 forwardly, all of which may be done with one hand, the rod 13 may be advanced as in the above described modification.

This modification is similar to that above described with the exception that in this latter modification the cap 61 is secured to and moves with the rod 13 sliding over the rear end of body member 10 instead of being secured to the body member 10 as shown in Figs. 1 and 3.

The constructions in which a scale and zero mark are utilized to determine the position of the rod 13 and the gauge members 11 may be modified by mounting a dial indicator as shown at 70 in Figs. 7 and 8 on the rear end of the body member 10. The movable contact ball or point 71 of the indicator is extended down and engages a suitable orifice 72 provided in the sleeve 26 so that movements of the sleeve 26 are imparted to the dial indicator. As shown in these figures, the dial member may be applied to either the modification shown in Fig. 3 or that shown in Fig. 5. The position of the sleeve relative to the body member 10 and consequently the position of the gaging members is indicated by the position of the indicator pointer 73.

What I claim is:

1. A gauge comprising in combination, a body member, gaging members inserted therein, means to move said gaging members into and out of gaging position, and means for holding said gaging members in contact with said moving means, said holding means comprising leaf springs having their central portion engaging said body member and their end portions engaged by said gaging members.

2. A gauge comprising in combination, a body member, gaging members inserted therein and having cut-out portions, means to move said gaging members into and out of gaging position, and means for holding said gaging members in contact with said moving means, said holding means comprising leaf springs having their central portion engaging said body member and their end portions engaged by said gaging members.

3. A gauge comprising in combination, a body member, gaging members inserted therein and having cut-out portions, separate means to move said gaging members respectively into and out of gaging position, and flexible means inserted within said cut-out portions of said gaging members and having portions engaging said body member whereby said gaging members are resiliently held in contact with said moving means.

4. A device for measuring the diameter of cylindrical holes, comprising in combination a body member, a plurality of radially movable gaging members carried by the inner part of the body member and each having an axially elongated contact face, resilient means for moving the gaging members radially outward simultaneously and uniformly to bring the axially elongated faces thereof into engagement with the walls of a cylindrical hole to be gaged and thus center the body member in the hole, means carried by the outer part of the body member for indicating the diameter of the hole as measured by the gaging members in engagement with the wall thereof, a relatively movable element carried by the outer part of the body member and adapted to be engaged by a man's hand, a connection between the relatively movable element and the gaging members for causing the movement of the gaging members inward in opposition to the resilient means, and a handle on the body member adjacent the said relatively movable element and adapted to be engaged by the fingers of the same hand that engages the said relatively movable element, whereby a man by gripping the said handle and the said element with one hand can bodily move the entire device and place it in measuring position and can allow the gaging members to move radially inward or release them to permit them to move outward into engagement with the walls of the hole to effect centering and measuring.

In testimony whereof, I hereto affix my signature.

EARLE BUCKINGHAM.